US012595870B2

(12) United States Patent
Gentil et al.

(10) Patent No.: US 12,595,870 B2
(45) Date of Patent: Apr. 7, 2026

(54) UNDERWATER HEATED PIPE FOR THE TRANSPORT OF FLUIDS AND METHOD FOR ASSEMBLING SUCH A PIPE

(71) Applicant: SAIPEM S.A., Montigny le Bretonneux (FR)

(72) Inventors: Frédéric Gentil, Montigny le Bretonneux (FR); Raymond Hallot, Voisins le Bretonneux (FR); Thomas Valdenaire, Courbevoie (FR)

(73) Assignee: SAIPEM S.A., Montigny le Bretonneux (FR)

( * ) Notice: Subject to any disclaimer, the term of this patent is extended or adjusted under 35 U.S.C. 154(b) by 950 days.

(21) Appl. No.: 17/617,524

(22) PCT Filed: Jun. 17, 2020

(86) PCT No.: PCT/FR2020/051050
§ 371 (c)(1),
(2) Date: Dec. 8, 2021

(87) PCT Pub. No.: WO2020/260802
PCT Pub. Date: Dec. 30, 2020

(65) Prior Publication Data
US 2022/0252198 A1      Aug. 11, 2022

(30) Foreign Application Priority Data
Jun. 24, 2019    (FR) ...................................... 1906802

(51) Int. Cl.
*F16L 53/37*          (2018.01)
*F16L 53/34*          (2018.01)
(52) U.S. Cl.
CPC ............... *F16L 53/37* (2018.01); *F16L 53/34* (2018.01)

(58) Field of Classification Search
CPC ... F16L 53/34; F16L 53/37; F16L 1/18; F16L 1/207; F16L 39/005; F16L 58/181;
(Continued)

(56) References Cited

U.S. PATENT DOCUMENTS 4,415,184 A * 11/1983 Stephenson ........... E21B 36/003
285/47
9,018,569 B2    4/2015 Geertsen
(Continued)

FOREIGN PATENT DOCUMENTS

FR        2722359 A1      1/1996
GB        2084284 A       4/1982
(Continued)

OTHER PUBLICATIONS

Search Report from corresponding French Application No. FR1906802, Feb. 13, 2020.
(Continued)

*Primary Examiner* — Sang Y Paik
(74) *Attorney, Agent, or Firm* — Workman Nydegger

(57)          ABSTRACT

A heated subsea pipe and process for transporting fluids, includes a plurality of pipe sections each having a transport tube for receiving the fluids, an electrically insulating inner layer arranged around the transport tube, a sealing tube made of electrically conductive material arranged around the electrically insulating inner layer, a thermally insulating outer layer arranged around the sealing tube. The transport tube is electrically connected to the sealing tube at each of the two ends of the pipe. The pipe includes two electrical cables connected to an electric generator and, to the transport tube and to the sealing tube of the pipe at a point situated between the two ends of the pipe to produce two
(Continued)

parallel electrical circuits each traversed by an electric current for heating the transport tube of the pipe by Joule effect.

16 Claims, 6 Drawing Sheets

(58) Field of Classification Search
CPC ..... F16L 59/143; F16L 59/20; F16L 9/18–20; F16L 13/0227
USPC .......................................................... 392/469
See application file for complete search history.

(56) References Cited

U.S. PATENT DOCUMENTS

| | | | | |
|---|---|---|---|---|
| 2003/0017007 | A1* | 1/2003 | Bass | F16L 9/18 |
| | | | | 405/154.1 |
| 2014/0375049 | A1* | 12/2014 | Mair | F16L 39/005 |
| | | | | 285/123.1 |
| 2020/0115994 | A1* | 4/2020 | Damour | E21B 36/04 |
| 2021/0301964 | A1* | 9/2021 | Hallot | F16L 53/37 |

FOREIGN PATENT DOCUMENTS

| | | | |
|---|---|---|---|
| WO | 2011138596 | A1 | 11/2011 |
| WO | 2015171902 | A1 | 11/2015 |
| WO | 2016000716 | A1 | 1/2016 |

OTHER PUBLICATIONS

International Search Report and Written Opinion from PCT Application No. PCT/FR2020/051050, Sep. 22, 2020.

Egyptian Office Action from Corresponding Egyption Patent Application No. EG2021111847, Jun. 26, 2023.

* cited by examiner 2-s 10-s 6-s 8-s 4-s 2-s 2-s 2-t

UNDERWATER HEATED PIPE FOR THE TRANSPORT OF FLUIDS AND METHOD FOR ASSEMBLING SUCH A PIPE

TECHNICAL FIELD

The present invention relates to the general field of electrical heating of pipes for transporting fluids in deep waters, and in particular to subsea pipes resting on the seabed and transporting subsea hydrocarbons, in particular oil and gas.

The invention relates more particularly to single-walled subsea pipes.

PRIOR ART

It is common in a single offshore hydrocarbon production field to operate several wells that may be separated from each other by several kilometers, indeed even tens of kilometers. The fluids from these different wells must be collected by metal (typically steel) subsea pipes laid on the seabed and transferred by bottom-to-surface connector pipes to a surface installation, for example a platform, a ship or an onshore collection point, which will collect them for storage (and possibly treat them).

Fluids from production wells tend to cool rapidly as they travel through the many kilometers of subsea pipes or during production shutdowns. If no measures are taken to maintain a minimum threshold temperature inside these pipes, there is a significant risk that gas molecules, in particular methane, contained in the transported fluids will combine with water molecules to form hydrate crystals at low temperatures. The latter can stick to the walls, agglomerate and lead to the formation of plugs capable of blocking the flow of fluids inside the pipes. Similarly, the solubility in oil of high-molecular-weight compounds, such as paraffins or asphaltenes, decreases as the temperature drops, which gives rise to solid deposits that are also capable of blocking flow.

In the case of so-called "single-walled" subsea pipes, it is known to use passive or active solutions to try to remedy this problem. In the case of a passive solution, it is for example known to position around the pipe a thermally insulating outer layer, typically a polymeric sheath, this layer being in direct contact with the sea water.

In the case of an active solution, it is known to use a heating solution. The most common solution consists in heating the subsea pipe by applying an alternating electric current directly to the inner steel casing of the pipe, this casing being connected at each end of the pipe to an electrical cable. The inner casing is not electrically insulated from the seawater in which the pipe is immersed, leading to strong currents flowing in the seawater and greatly reducing the efficiency of the solution.

In the case of so-called "double-walled" subsea pipes of the "pipe-in-pipe" or PIP type in which an inner casing transports the fluids and an outer casing coaxial with the inner casing is in contact with the sea water, it is also known to use passive or active solutions to try to remedy the problems associated with the cooling of the fluid.

In the case of a passive solution, it is known, for example, to place a layer of thermal insulation between the inner and outer casings. This layer has very good thermal performance, as it is mechanically protected from the surrounding environment by the two casings.

One of the active solutions consists of heating the inner casing of the pipe by means of round or flat electrical cables which are arranged around the inner casing along its entire length to heat it by Joule effect. The electrical power that is supplied to the electrical cables comes from an external electric generator connected to the cables by an umbilical. This electrical heating solution, which is called heat tracing, allows the fluids transported in the pipes to be maintained at a temperature above a critical threshold throughout their journey from the production well to the surface installation, as well as during production shutdowns.

Another known active solution consists in heating the subsea pipe by applying an alternating electric current directly to the inner steel casing of the pipe, the outer casing also made of steel being used as a conductor for the return path of the electric current. The alternating electric current which flows through the inner casing thus enables it to be heated by the Joule effect. More precisely, the heating of the inner casing is produced by the Joule effect by the current which passes through it; the heat produced is largely transmitted to the fluids in the inner casing, the heat losses through the insulation filling the annular space between the inner casing and the outer casing being relatively reduced. This electrical heating solution is called direct electrical heating (DEH).

Document WO 2011/138596 describes the application of such an active electric heating solution to a single-walled subsea pipe. In this document, the pipe comprises a fluid transport tube around which an external grid is positioned for the transport of electric current, an electrically insulating intermediate layer being interposed between the tube and the grid.

However, this solution has a number of disadvantages, in particular in terms of reliability, due to the presence of the external grid used to transport the electric current, which is not watertight to a possible influx of water, the consequences of which could lead to a complete breakdown of the heating system.

DISCLOSURE OF THE INVENTION

The subject matter of the invention is therefore to provide a heating solution for a single-walled pipe that does not have the above-mentioned disadvantages.

In accordance with the invention, this aim is achieved by virtue of a heated subsea pipe for transporting fluids, comprising a plurality of pipe sections joined end-to-end, each pipe section comprising:

a transport tube for receiving the fluids to be transported, an electrically insulating inner layer arranged around and covering the transport tube, a sealing tube made of electrically conductive material arranged around and covering the electrically insulating inner layer, a thermally insulating outer layer arranged around and covering the sealing tube, the transport tube being electrically connected to the sealing tube at each of the two ends of the pipe, the pipe further comprising two electrical cables connected, on the one hand, to an electric generator and, on the other hand, to the transport tube and to the sealing tube of the pipe at a point situated between the two ends of the pipe so as to produce two parallel electrical circuits each traversed by an electric current for heating the transport tube of the pipe by Joule effect.

The pipe according to the invention is remarkable in that it provides an electric heating system in which the sealing tube made of an electrically conductive material which allows the electric current to be transported is perfectly watertight, thus preventing any influx of water. Furthermore, the solution according to the invention has the advantage of having a very high heating efficiency, of the order of 85% to 90% of the injected electric current which participates in the heating of the transported fluid (for a rate of less than 60% for the electric heating solutions known in the prior art in the case of "single-walled" subsea pipes).

Thus, the invention makes it possible to install subsea heating pipes in very deep water with good heating efficiency and high reliability.

Preferably, the electrical cables are connected to the transport tube and to the sealing tube of the pipe at a point equidistant from the two ends of the pipe. This arrangement ensures highly uniform heating along the pipe.

Preferably also, the sealing tube is made of a material whose magnetic permeability and electrical conductivity are such that the electric current generated by the electric generator flows predominantly along an inner surface of the sealing tube. Thus, potential current leakage into the sea water is reduced, increasing the efficiency of the system.

Preferably also, the sealing tube is made of carbon steel, the transport tube is made of carbon steel, the electrically insulating inner layer is made of polymer, and the thermally insulating outer layer is made of polypropylene, polyurethane, polydicyclopentadiene or polystyrene.

For a pipe section having a length of 12 m to 48 m, the transport tube may have a thickness comprised between 5 mm and 50 mm, the electrically insulating inner layer may have a thickness comprised between 6 mm and 20 mm, the sealing tube may have a thickness comprised between 1 mm and 10 mm, and the thermally insulating outer layer may have a thickness comprised between 20 mm and 150 mm.

Even more preferably, the pipe further comprises a plurality of mechanical connections between the transport tubes and the sealing tubes of the pipe in order to allow the transmission of axial forces between these tubes.

The invention also has as its subject matter a process for assembling a pipe as defined above, comprising successively, for two adjoining pipe sections, placing around the sealing tube of one of the two pipe sections an annular sealing sleeve, welding the respective transport tubes of the two pipe sections at one of their free ends, moving and welding the sealing sleeve to the respective sealing tubes of the two pipe sections, inserting an electrically insulating inner layer connection under the sealing sleeve; and placing a thermally insulating outer layer connection around the sealing sleeve.

Preferably, the process further comprises making a plurality of mechanical connections between the transport tubes and the sealing tubes of the pipe to allow transmission of axial forces between these tubes.

The mechanical connections may be made by annularly stamping the sealing tubes of the pipe to form a plurality of annular contact surfaces along the pipe between the sealing tubes and the electrically insulating inner layers.

Alternatively, the mechanical connections may be made through particular shapes of certain sealing sleeves. In this case, certain sealing sleeves may have a conical shape at an outer surface or a serration at an inner surface.

4

Figure 4:
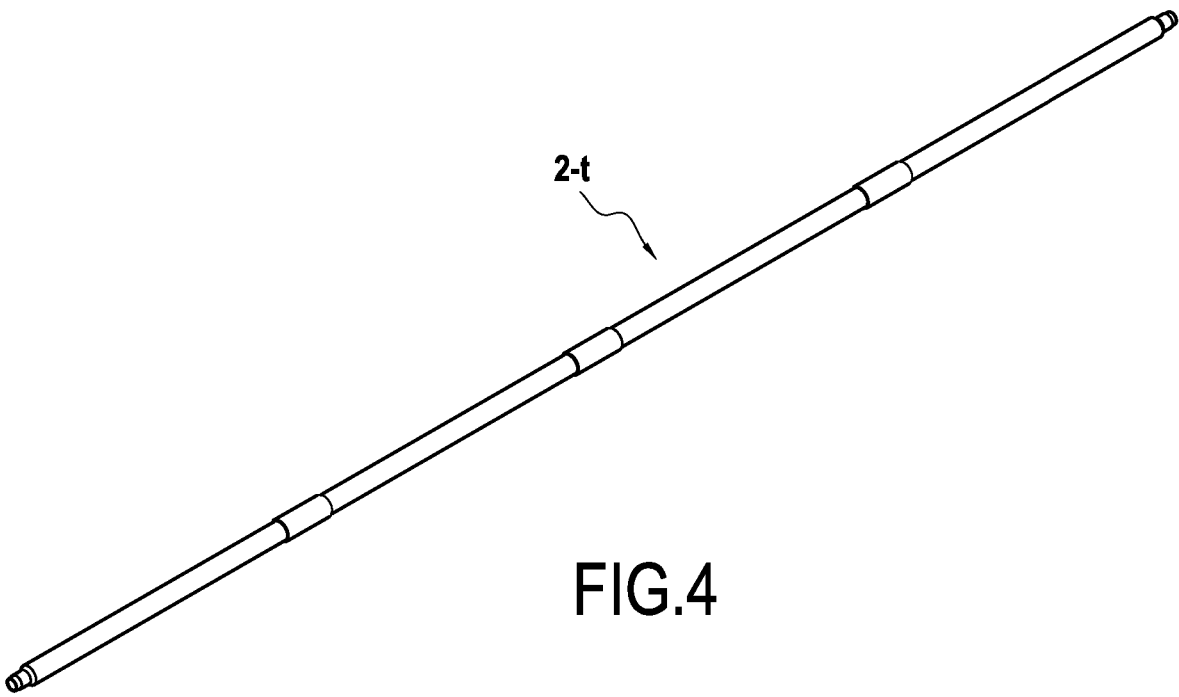

FIG. 4 shows another step in the process for assembling a pipe according to the invention.

Figure 5:
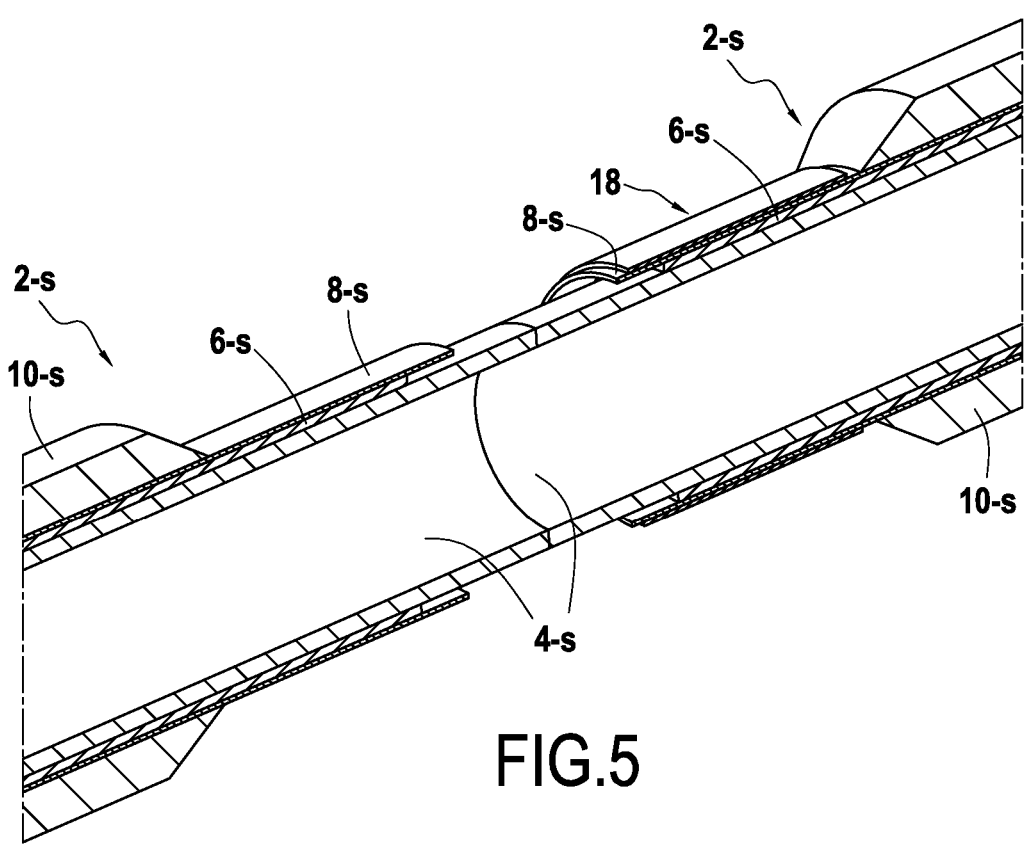

FIG. 5 shows another step in the process for assembling a pipe according to the invention.

Figure 6:
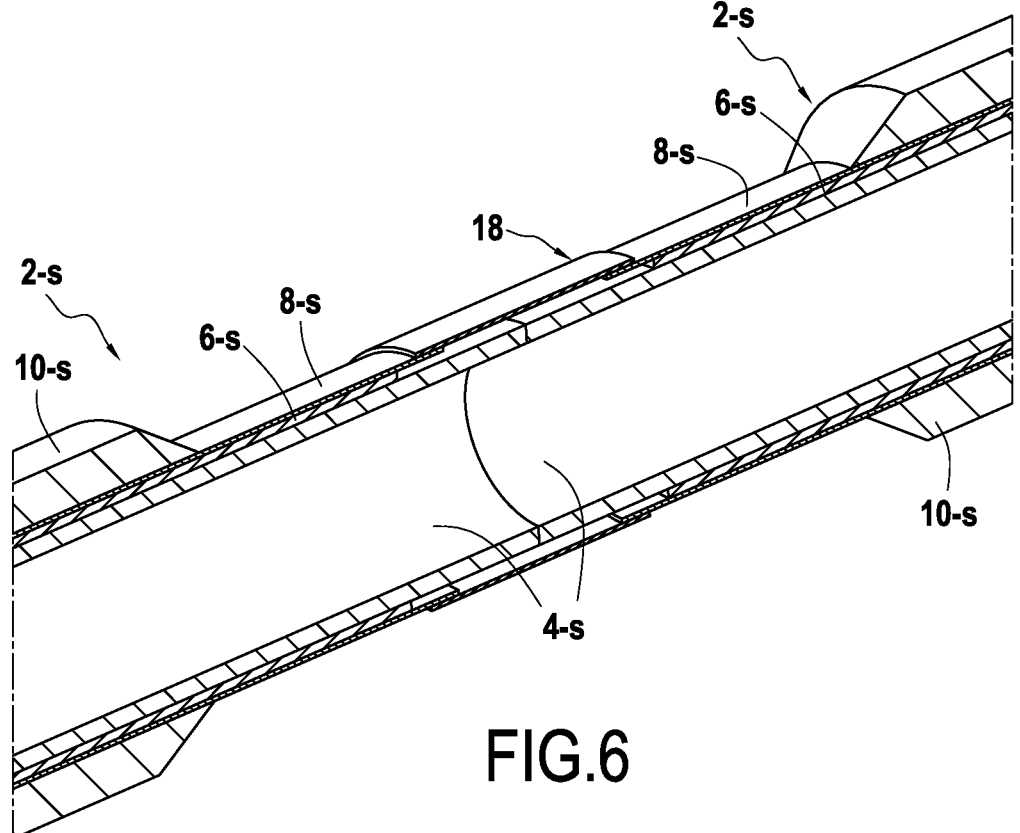

FIG. 6 shows another step in the process for assembling a pipe according to the invention.

Figures 7, 8:
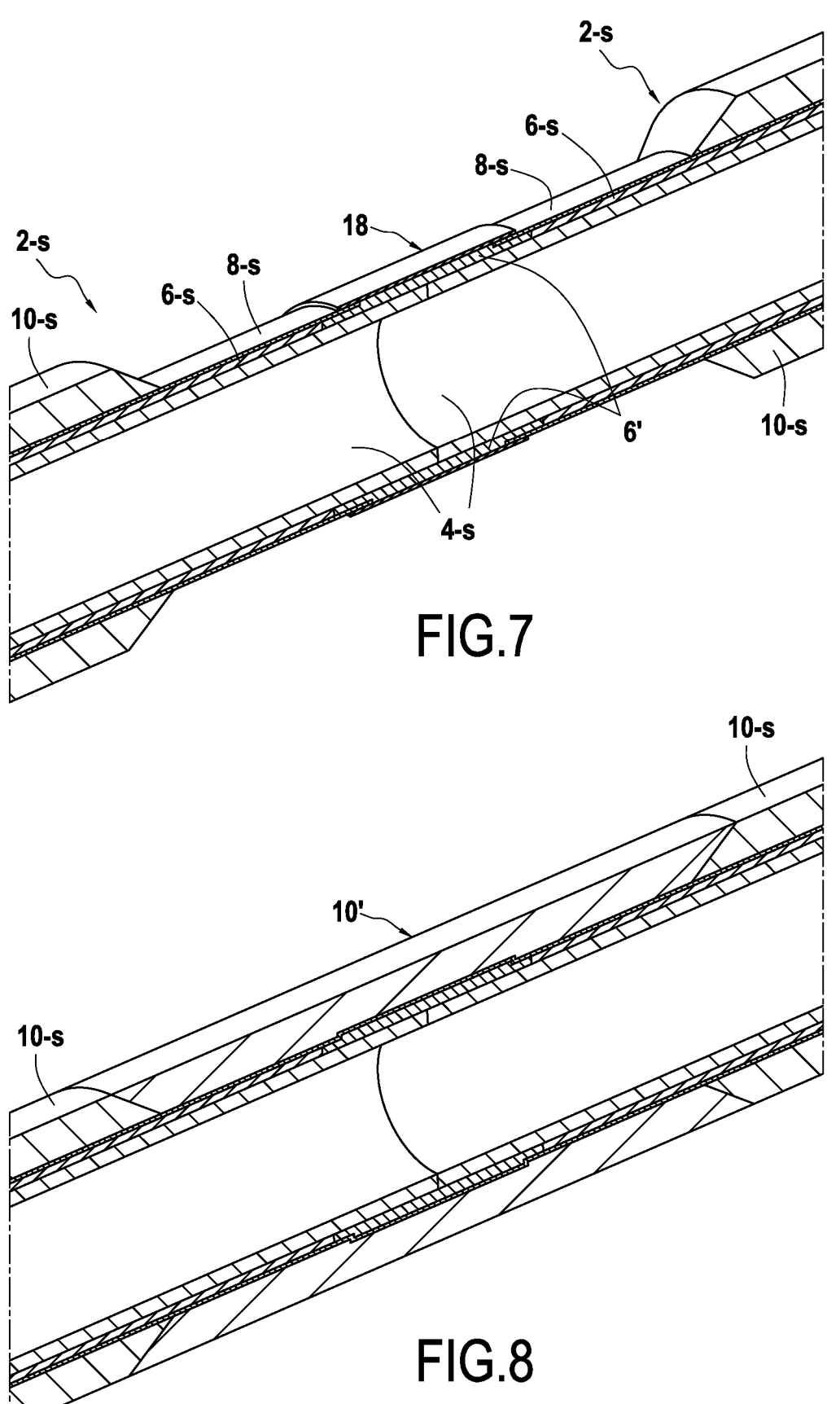

FIG. 7 shows another step in the process for assembling a pipe according to the invention.

FIG. 8 shows another step in the process for assembling a pipe according to the invention.

Figure 9:
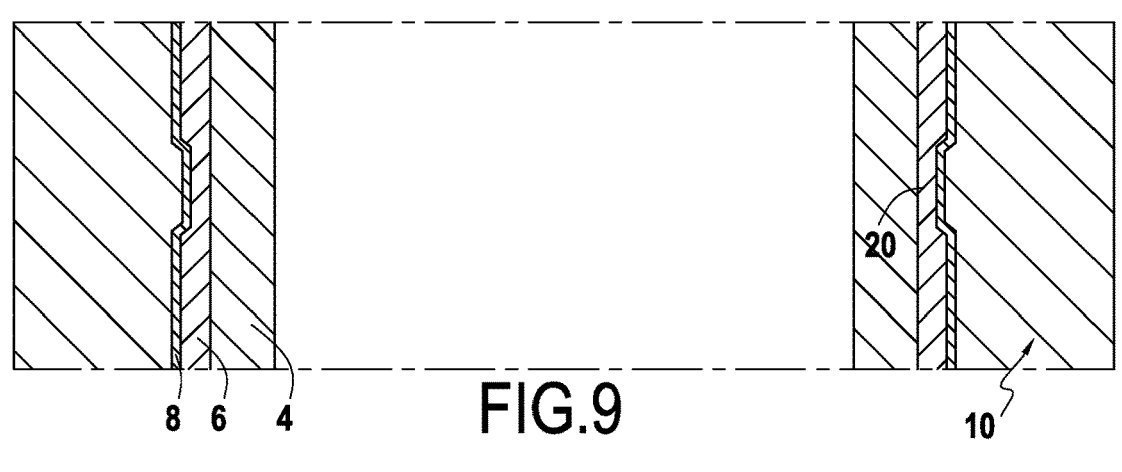

FIG. 9 shows an additional step of the assembly process according to the invention comprising making mechanical connections between the transport and sealing tubes.

Figure 10:
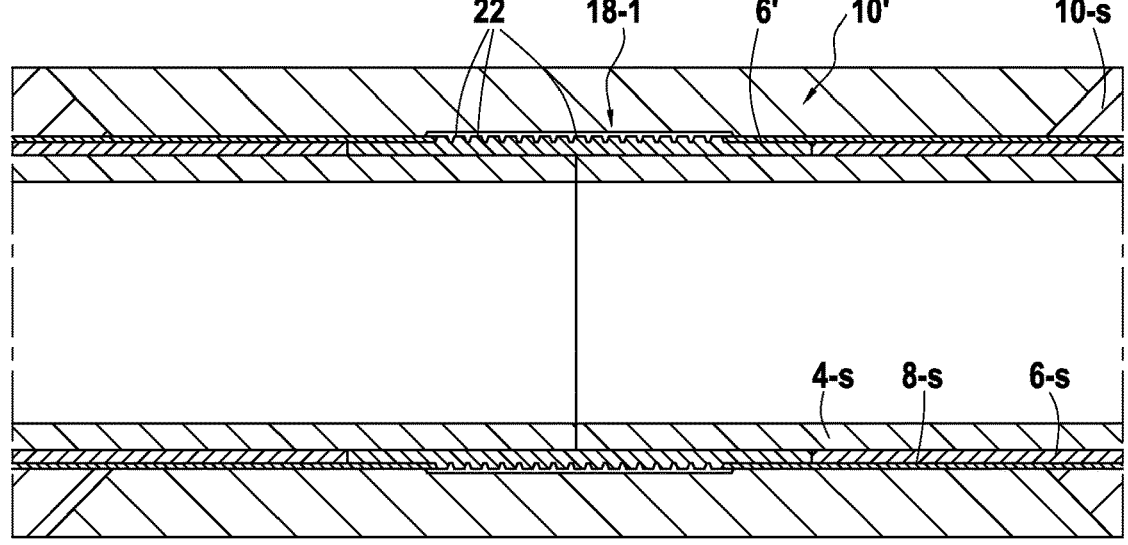

FIG. 10 shows an alternative embodiment of the step illustrated by FIG. 9.

Figure 11:
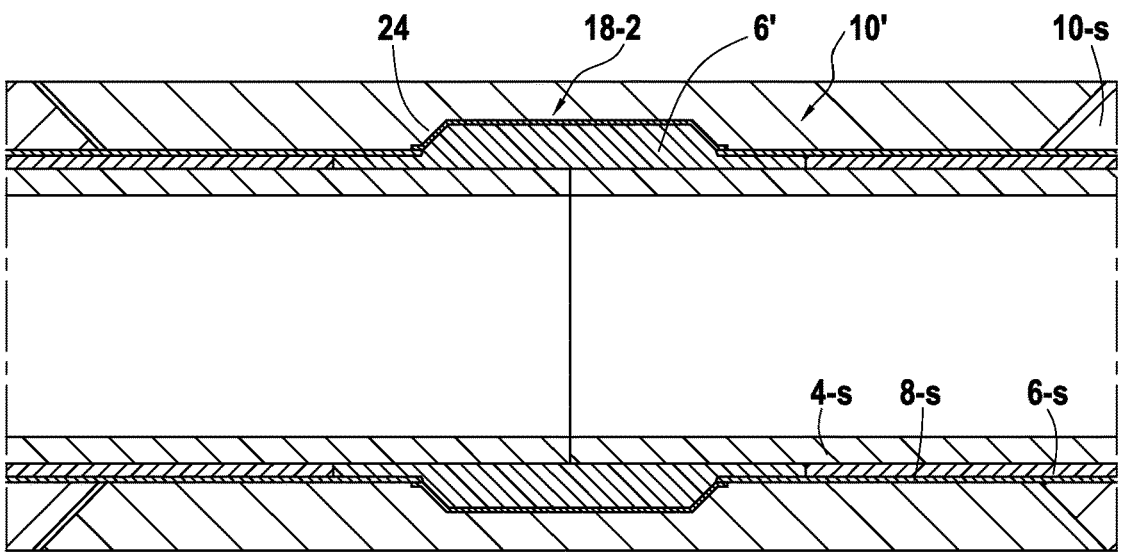

FIG. 11 shows another alternative embodiment of the step illustrated by FIG. 9.

DESCRIPTION OF THE EMBODIMENTS

The invention relates to the direct electrical heating of any onshore or subsea single-walled fluid transport tube, and in particular to the direct electrical heating of single-walled steel subsea pipes lying on the seabed and providing transport between subsea hydrocarbon production wells, in particular oil and gas, and a surface installation.

Figure 1:
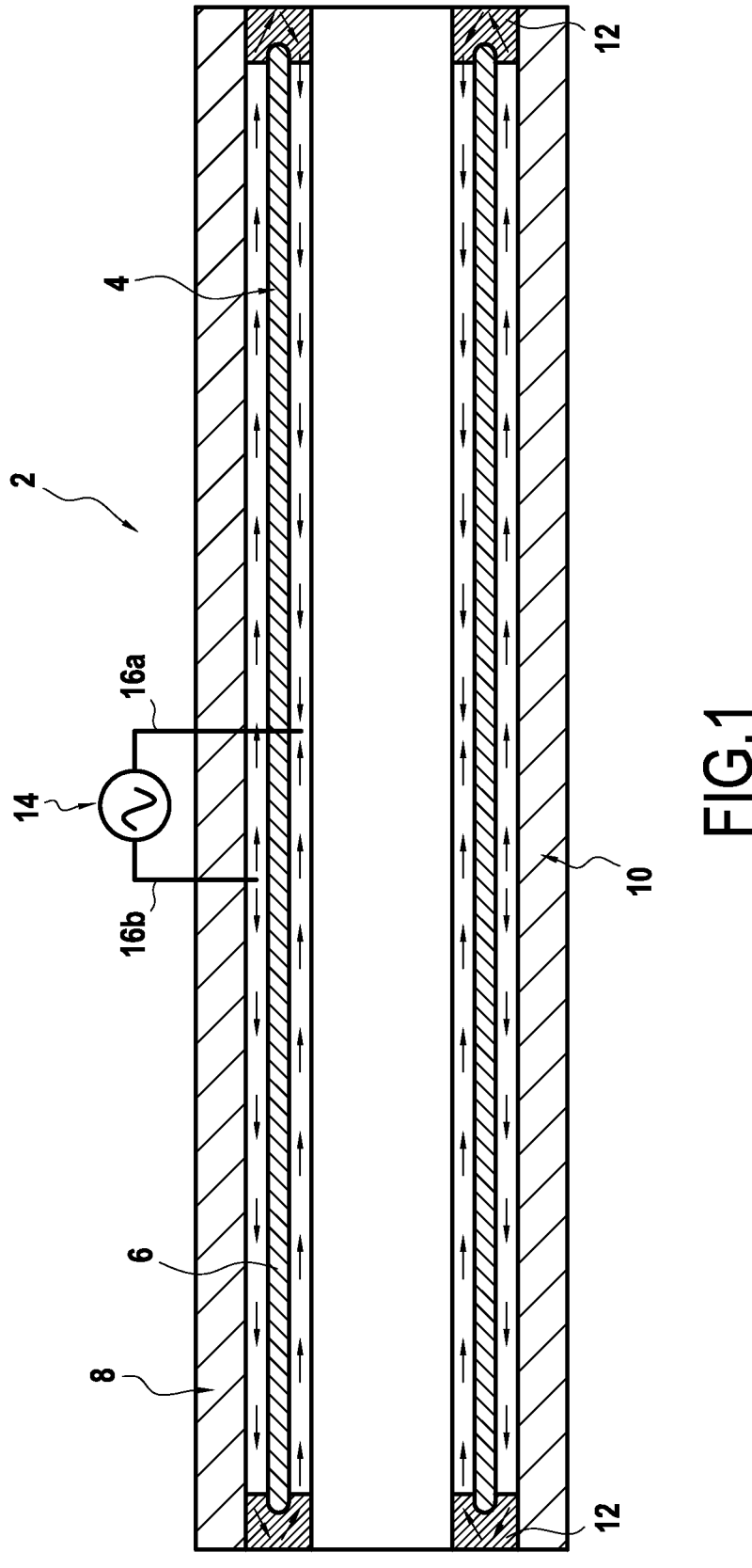
FIG. 1 is a schematic and longitudinal cross-sectional view of a subsea pipe according to the invention.

An example of a single-walled subsea pipe is shown in FIG. 1 (drawing not to scale). Typically, the pipe 2 comprises an inner transport tube 4 for receiving the fluids to be transported.

This transport tube 4 has two main functions, namely the circulation of fluids and heating by Joule effect when an electric current flows through it. It is preferably made of carbon steel.

The pipe 2 also comprises an electrically insulating inner layer 6 which is arranged around and covering the transport tube 4, and a sealing tube 8 which is made of an electrically conductive material and which is arranged around and covering the electrically insulating inner layer 6.

Finally, the pipe 2 further comprises a thermally insulating outer layer 10 which is arranged around and covering the sealing tube 8.

The electrically insulating inner layer 6 serves to electrically insulate the transport tube 4 from the sealing tube 8. It is made of any material having sufficient dielectric strength and low compressibility to prevent excessive deformation of the surrounding sealing tube when the latter is subjected to external hydrostatic pressure. For example, the electrically insulating inner layer 6 is made of a polymer.

The sealing tube 8 has two main functions, namely the flow of electric current and the sealing of the annular space between itself and the transport tube to prevent seawater infiltration.

In view of this dual function, the sealing tube is a solid tube, i.e., it has no spaces or interstices through which seawater can infiltrate.

The sealing tube 8 is made of a material whose magnetic permeability and electrical conductivity are such that the electrical heating current flows predominantly along its inner surface. For example, the sealing tube is made of carbon steel.

The function of the thermally insulating outer layer 10 is to provide passive protection against the cooling of the transported fluids. It is typically made of polypropylene, polyurethane, polydicyclopentadiene or polystyrene.

According to the invention, the transport tube 4 is electrically connected to the sealing tube 8 at each of the two ends of the pipe by means of annular electrical connectors 12. For example, these electrical connectors are made of carbon steel.

Still according to the invention, the pipe 2 further comprises an electric current generator 14 which is connected, on the one hand, to the transport tube 4 by a first electrical cable 16*a*, and, on the other hand, to the sealing tube 6 of the pipe by a second electrical cable 16*b*.

This electrical connection is made at a point situated between the two ends of the pipe so as to create two parallel electrical circuits, each of which carries an electric current (the arrows in FIG. 1 represent an example of the electric current flowing in these two circuits).

In a known way, the circulation of these electric currents heats the transport tube 4 as well as the sealing tube 8 of the pipe by Joule effect.

Preferably, the electrical connection point is located equidistant from the two ends of the pipe so as to obtain uniform heating of the entire pipe.

In connection with FIGS. 2 to 11, a process for assembling such a subsea pipe will now be described.

By way of introduction, it should be noted that the pipe according to the invention is applicable to any known type of assembly and laying of a subsea pipe, and in particular to J-lay, S-lay, reel lay, etc.

In the example described below, particular attention will be paid to J-lay of the pipe, which has the advantage of providing great flexibility in terms of laying depth and pipe diameter. An S-lay would follow a relatively similar assembly process.

Figure 2:
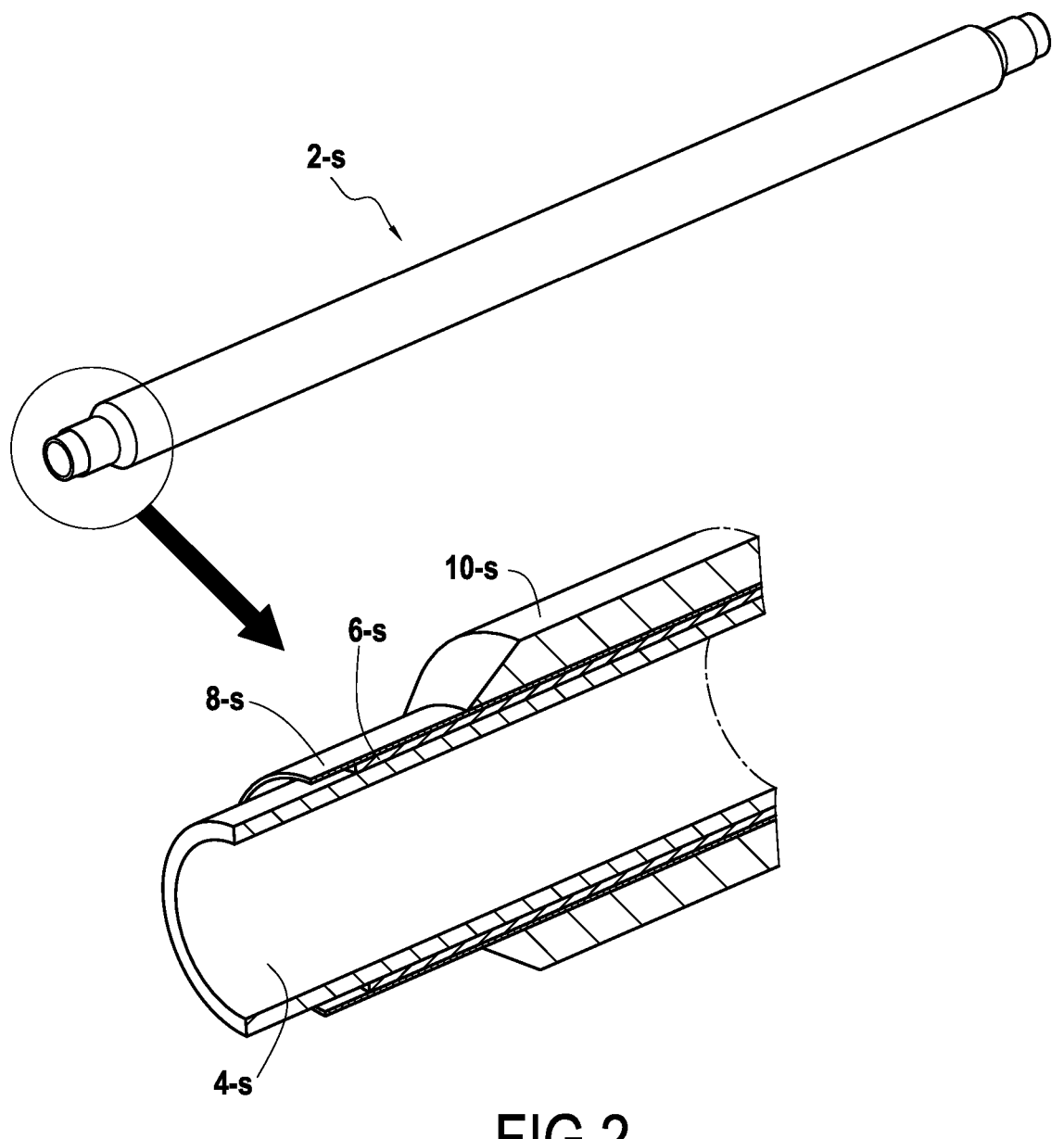
FIG. 2 shows a first step in the process for assembling a pipe according to the invention.

In a known way, such a J-lay requires the prior manufacture of a plurality of sections of pipe 2-*s* such as that shown in FIG. 2, each section typically having a length of 12 to 48 m.

Each pipe section 2-*s* comprises (from the inside to the outside): a transport tube section 4-*s*, an electrically insulating inner layer section 6-*s*, a sealing tube section 8-*s*, and a thermally insulating outer layer section 10-*s*, these sections corresponding to the elements of the pipe according to the invention described above.

It should be noted here that for a pipe section of 12 to 48 m in length, the transport tube section 4-*s* has a thickness comprised between 5 mm and 50 mm, the electrically insulating inner layer section 6-*s* has a thickness comprised between 3 mm and 15 mm, the sealing tube section 8-*s* has a thickness comprised between 1 mm and 10 mm, and the thermally insulating outer layer section 10-*s* has a thickness comprised between 20 mm and 150 mm.

The next step in the assembly process consists in assembling several 2-*s* pipe sections into longer pipe sections onshore or directly at sea on the installation vessel.

Figure 3:
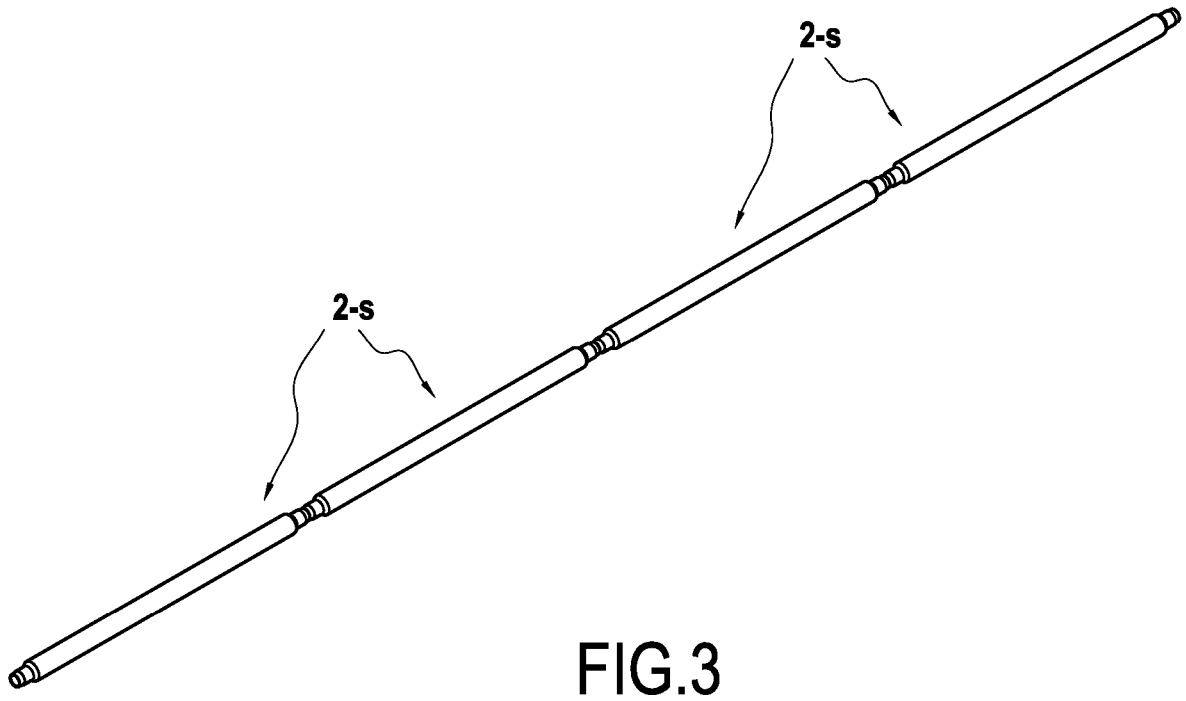
FIG. 3 shows another step in the process for assembling a pipe according to the invention.

By way of example, as shown in FIG. 3, four pipe sections 2-*s* may be joined end-to-end to form a pipe section.

After having reconstituted the different layers around the transport tube section connections (according to a process detailed hereinbelow), a section of pipe 2-*t* such as shown in FIG. 4, usually called quad joint, is obtained.

Once the pipe sections (or quad joints) have been thus assembled, the pipe can be installed offshore by connecting them end-to-end, with the connection of the different pipe sections typically taking place in a vertical guide rail.

In connection with FIGS. 5 to 11, the way in which two pipe sections 2-*s* are connected to each other is described in detail. The same process is used to connect two pipe sections 2-*t*

In a first step, as shown in FIG. 5, an annular sealing sleeve 18 is placed around the sealing tube section 8-*s* of one of the two pipe sections 2-*s*.

The sealing sleeve 18 is made of an electrically conductive material, and preferably of the same material as the sealing tube of the pipe.

The two pipe sections are joined end-to-end and the respective free ends of their transport tube section 4-*s* are welded together.

As shown in FIG. 6, the sealing sleeve 18 is moved to cover the weld seam between the transport tube sections. The sealing sleeve 18 is then welded at each of its free ends to the respective sealing tube sections of the two pipe sections to ensure continuity of the sealing tube.

Furthermore, it is possible to reconstitute the electrically insulating inner layer under the sealing sleeve 18. For example, as shown in FIG. 7, it is possible to insert an inner insulating layer connection 6' under the sealing sleeve 18 by molding, the sealing sleeve and the transport tube 4-*s* and sealing tube 8-*s* sections acting as a mold.

To this end, it is advisable to have a suitable injection system via, for example, one or more openings in the sealing sleeve, which are then sealed.

Finally, as shown in FIG. 8, the thermal insulation is reconstituted by placing a thermally insulating outer layer connection 10' around the sealing sleeve 18.

Furthermore, during assembly of the pipe, it is important to ensure that there is no relative movement between the transport tube and the sealing tube when the pipe is positioned vertically in the guide rail.

Indeed, the electrically insulating inner layer of the pipe has a strong adhesion to the transport tube, but the sealing tube has a priori only a frictional contact with this electrically insulating inner layer.

Also, advantageously, a plurality of mechanical connections are provided between the transport tube 4 and the sealing tube 8 of the pipe in order to allow the transmission of axial forces between these tubes.

In the example embodiment shown in FIG. 9, the mechanical connections are made by annularly stamping the sealing tube 8 of the pipe to form a plurality of annular contact surfaces 20 along the pipe between the sealing tube and the electrically insulating inner layer 6.

These contact surfaces 20 may or may not be evenly spaced along the pipe.

In another example embodiment shown in FIGS. 10 and 11, it is possible to achieve a particular dimensioning of the connections made during the assembly of a pipe section 2-*t*.

These connections can be made onshore prior to the installation campaign and are therefore less critical in terms of time and complexity.

In this way, it is possible to play with the shape of certain sealing sleeves to enable them to ensure continuity of the sealing tube sections 8-*s* of the pipe while allowing the transmission of axial forces between the transport tube and the sealing tube.

In the example embodiment of FIG. 10, the sealing sleeve 18-1 thus has a notch 22 at its inner surface in contact with the inner insulating layer connection 6'.

In the example embodiment of FIG. 11, the sealing sleeve 18-2 has a conical shape 24 at its outer surface, i.e., in the direction of the thermally insulating outer layer connection 10'.

The invention claimed is:

1. A heated subsea pipe for transporting fluids, comprising a plurality of pipe sections joined end-to-end, each pipe section comprising:

a transport tube for receiving the fluids to be transported, an electrically insulating inner layer arranged around and covering the transport tube, a sealing tube made of electrically conductive material arranged around and covering the electrically insulating inner layer, a thermally insulating outer layer arranged around and covering the sealing tube, and a plurality of mechanical connections between the transport tube and the sealing tube configured to allow transmission of axial forces between the transport tube and the sealing tube, wherein the plurality of mechanical connections are made through sealing sleeves having a notch on an inner surface, the heated subsea pipe further comprising:

an annular sealing sleeve made of electrically conductive material, the annular sealing sleeve being positioned around the sealing tube of the pipe section and arranged to cover a weld seam between adjacent transport tubes, wherein adjacent sealing tubes are welded at respective free ends to ensure continuity of the sealing tubes, and the electrically insulating inner layer connection arranged within the annular sealing sleeve, the transport tube being electrically connected to the sealing tube at each of the two ends of the heated subsea pipe, the heated subsea pipe further comprising two electrical cables connected, on the one hand, to an electric generator and, on the other hand, to the transport tube and to the sealing tube of the plurality of pipe sections at a point situated between the two ends of the heated subsea pipe so as to produce two parallel electrical circuits each traversed by an electric current for heating the transport tube of the pipe section by Joule effect.

2. The pipe according to claim 1, wherein the electrical cables are connected to the transport tube and to the sealing tube of the pipe section at a point equidistant from the two ends of the heated subsea pipe.

3. The pipe according to claim 1, wherein the sealing tube is made of a material whose magnetic permeability and electrical conductivity are such that the electric current generated by the electric generator flows predominantly along an inner surface of the sealing tube.

4. The pipe according to claim 3, wherein the sealing tube is made of carbon steel.

5. The pipe according to claim 1, wherein the transport tube is made of carbon steel.

6. The pipe according to claim 1, wherein the electrically insulating inner layer is made of polymer.

7. The pipe according to claim 1, wherein the thermally insulating outer layer is made of polypropylene, polyurethane, polydicyclopentadiene or polystyrene.

8. The pipe according to claim 1, wherein the pipe section has a length of 12 m to 48 m, the transport tube has a thickness comprised between 5 mm and 50 mm, the electrically insulating inner layer has a thickness comprised between 3 mm and 15 mm, the sealing tube has a thickness comprised between 1 mm and 10 mm, and the thermally insulating outer layer has a thickness comprised between 20 mm and 150 mm.

9. The pipe according to claim 1, further comprising a plurality of mechanical connections between transport tubes and sealing tubes of the plurality of pipe sections in order to allow the transmission of axial forces between these tubes.

10. The pipe according to claim 1, wherein the electrically insulating inner layer adheres to the transport tube and is in frictional contact with the sealing tube.

11. A process for assembling a pipe according to claim 1, comprising successively, for two adjoining pipe sections:

placing around the sealing tube of one of the two pipe sections an annular sealing sleeve;

welding the respective transport tubes of the two pipe sections at one of their free ends;

moving and welding the sealing sleeve to the respective sealing tubes of the two pipe sections;

inserting an electrically insulating inner layer connection under the sealing sleeve; and placing a thermally insulating outer layer connection around the sealing sleeve.

12. The process according to claim 11, further comprising making a plurality of mechanical connections between the transport tubes and the sealing tubes of the pipe to allow the transmission of axial forces between these tubes.

13. The process according to claim 12 wherein the mechanical connections are made by annularly stamping the sealing tubes of the pipe to form a plurality of annular contact surfaces along the pipe between the sealing tubes and the electrically insulating inner layers.

14. The process according to claim 12, wherein the mechanical connections are made through particular shapes of certain sealing sleeves.

15. The process according to claim 14, wherein certain sealing sleeves have a conical shape at an outer surface.

16. The process according to claim 14, wherein certain sealing sleeves have a notch at an inner surface.

* * * * *